United States Patent
Rikoski

(10) Patent No.: US 8,639,475 B1
(45) Date of Patent: Jan. 28, 2014

(54) SYSTEM AND METHOD FOR SPATIALLY INVARIANT SIGNAL DETECTION

(75) Inventor: Richard Rikoski, Alameda, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 747 days.

(21) Appl. No.: 12/454,486

(22) Filed: May 18, 2009

(51) Int. Cl.
*H04B 15/00* (2006.01)

(52) U.S. Cl.
USPC ............... 702/189; 702/194; 702/33; 702/38; 702/39; 702/40; 702/49; 702/191

(58) Field of Classification Search
USPC ............ 702/189, 33, 38, 39, 40, 49, 191, 194
See application file for complete search history.

(56) References Cited

U.S. PATENT DOCUMENTS

| | | | |
|---|---|---|---|
| 4,187,490 A * | 2/1980 | Ballard et al. | 367/121 |
| 5,930,201 A * | 7/1999 | Cray | 367/119 |
| 7,498,989 B1 * | 3/2009 | Volman | 343/700 MS |

OTHER PUBLICATIONS

Trees, Optimum Array Processing, Part IV of Detection, Estimation, and Modulation Theory, (2002).*
McCorkle et al., "Spatially Varying Aperture Weighting for Sidelobe Reduction and Resolution Enhancement of Imagery," Army Research Laboratory (1998).*

* cited by examiner

*Primary Examiner* — Sujoy Kundu
*Assistant Examiner* — Hyun Park
(74) *Attorney, Agent, or Firm* — James T. Shepherd

(57) ABSTRACT

A system and method of signal detection from a given point, in which a radiative aperture, such as a sonar sensor, radar antenna, acoustic sensor, or the like, receives radiation from the point at more than one range. At each range, the signal incident on each point within the aperture is weighted by the cosine of the angle between a surface normal at the point on the aperture, and a vector from the point on the aperture to the given point. The physical size and shape of the aperture may also be changed to cause the aperture to subtend the same solid angle having the given point as the vertex, at each range. In this manner, the signal from the given point becomes aperture shape independent, facilitating object recognition and imaging.

10 Claims, 5 Drawing Sheets

SYSTEM AND METHOD FOR SPATIALLY INVARIANT SIGNAL DETECTION

BACKGROUND OF THE INVENTION

The identification and imaging of objects by use of radiation systems is widespread, examples of which are marine sonars, microwave antennas, and medical ultrasound or magnetic resonance imagers; and uses of which include feature based navigation, object recognition and object imaging, coherent (full wave) correlation, coherent mosaicking, bathymetry, computed tomography, etc. Each suffers from the defect that detection of a radiative signal from a given point is aperture shape dependent, making signal correlation and image coherence problematic. Such variation in aperture shape is particularly felt in synthetic aperture systems, such as SAR or SAS.

An allied problem is that of a radiation sensor (e.g. radar or sonar) having curvature discontinuities, such as a sensor formed of a number of small, flat, segments disposed along an overall curve, or gaps between segments. Curvature of the sensor is discontinuous where individual segments join, or gaps lie, which distorts the image, if the image is not properly weighted.

SUMMARY OF THE INVENTION

Accordingly, an object of the invention is to permit signal detection that is aperture shape independent.

Another object is to permit, inter alia, aperture shape independent coherent feature based navigation, object recognition and object imaging, coherent (full wave) correlation, coherent mosaicking, bathymetry, computed tomography, and the like.

Another object is to permit aperture shape independent detection in, inter alia, marine sonars, microwave antennas, medical ultrasound or magnetic resonance imagers, and the like.

Another object is to permit the formation of synthetic apertures of substantially constant observation angle, despite variations in height or attitude of the platforms carrying the scanning sensors used form the synthetic apertures.

Another object is to permit formation of sensors with the same aperture shape despite discontinuity in sensor curvature.

Another object is to do the foregoing using extant radiative apertures.

In accordance with these and other objects made apparent hereinafter, the invention concerns a system and method in which a radiation sensor having a radiative aperture is deployed effective to permit receipt of radiation from a preselected point of interest located at a distance from the aperture. At substantially each point on the aperture, the portion of the radiation incident thereon is weighted by the cosine of the angle between a position vector from that point to the preselected point, and a vector normal to the aperture at that point. Additionally, one can selectively dispose the aperture to subtend a preselected solid angle having the preselected point at the angle's vertex, and excluding substantially all radiation from the preselected point outside the solid angle. By so doing, and preferably by keeping the solid angle the same regardless of distance between the aperture and the preselected point, one renders radiation detected at the aperture from the preselected point aperture shape independent. Because of this, images formed of the point in this manner are equivalent, and hence highly correlated.

These and other objects are further understood from the following detailed description of particular embodiments of the invention. It is understood, however, that the invention is capable of extended application beyond the precise details of these embodiments. Changes and modifications can be made to the embodiments that do not affect the spirit of the invention, nor exceed its scope, as expressed in the appended claims. The embodiments are described with particular reference to the accompanying drawings, wherein:

BRIEF DESCRIPTION OF THE DRAWINGS

FIG. 8b is a view in the direction of lines 8b-8b of FIG. 8a.

DETAILED DESCRIPTION

Figure 1:
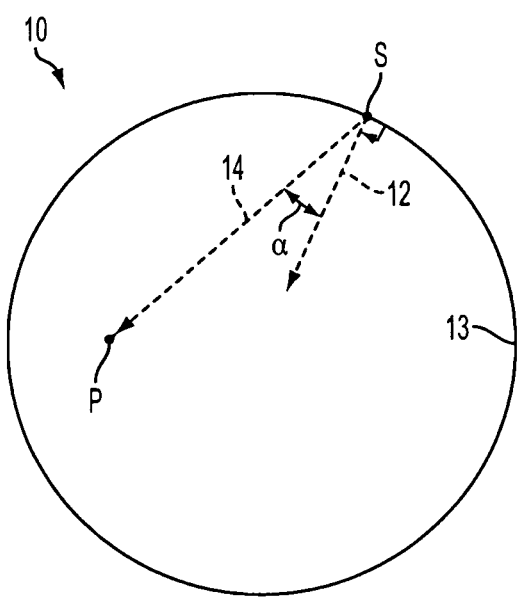
FIG. 1 is a transparent elevational view of a radiative aperture in the form of a closed surface, and is shown as transparent to reveal the space within, in order to illustrate theory on which the invention depends.

With reference to the drawing figures, wherein like numbers indicate like parts throughout the several views, FIG. 1 shows a closed radiative aperture 10 surrounding a point p arbitrarily disposed within aperture 10. Any radiation emitted from point p (including reflected radiation) will be incident upon inner surface 13 of aperture 10. The net signal detected by aperture 10 is the point spread function of point p integrated over surface 13, i.e. integrated over all points s on 13. A consideration of this integral leads to:

The Closed Aperture Theorem

If, for each point on the surface 13, one weights this integral by the cosine of angle α between normal 12, and position vector 14 directed between points s and p, the integral becomes spatially independent of position vector 14 in the direction of normal 12 (i.e. the radial component of vector 14), and depends solely on position on the surface of aperture 10, not on the distance from s to p. Subject to the assumption that point p is far enough from aperture 10 that the spreading loss to the main lobe and side lobes of the point spread function are approximately equal, the radiative signal from point p detected by aperture 10 will be spatially invariant. The spatial resolution of a typical sonar is about an inch; that of a radar on the order of a micrometer; an acoustical signal in a human the human body on the order of millimeters (n.b. ultrasound). Thus for practical purposes, the signal which aperture 10 receives from point p is unrelated to location of p. Although aperture 10 is illustrated as a sphere, making spherical coordinates the natural system in which to describe it, this result is wholly independent of the shape of 10. Were an aperture of any other shape to replace 10 and completely enclose point p, radiation from point p would still be spatially invariant in the manner above described.

The Open Aperture Theorem

Figure 2:
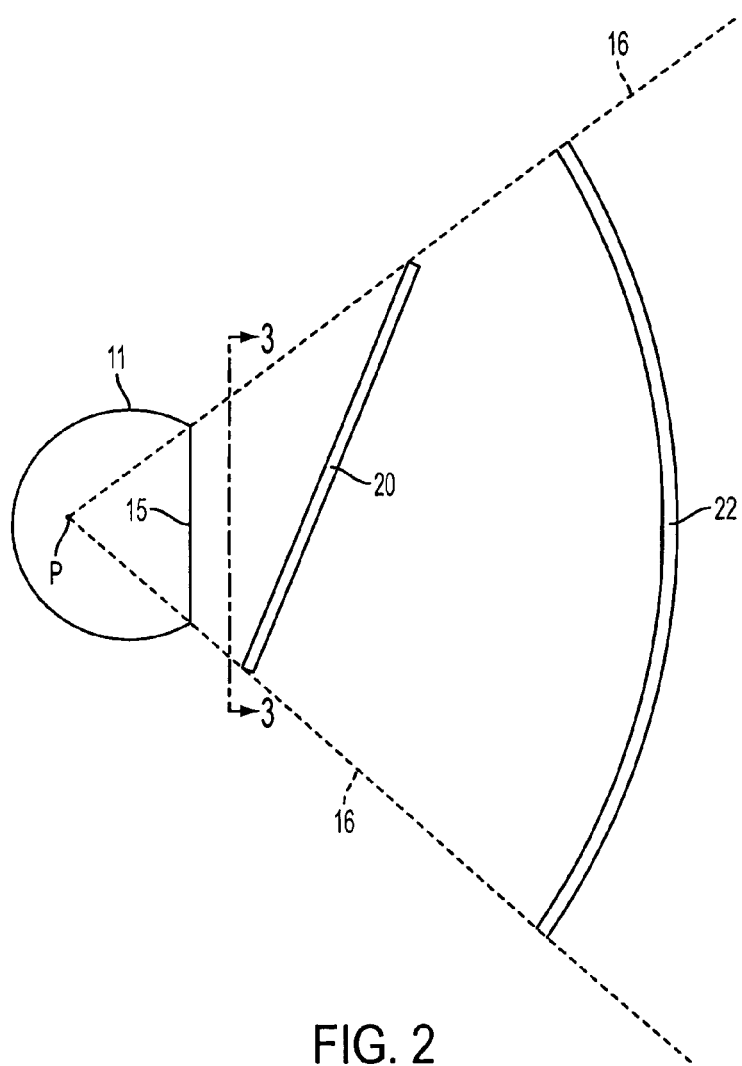
FIG. 2 is a side elevational view of the aperture of FIG. 1 with a portion removed, and several other radiative sensors.
Figure 3:
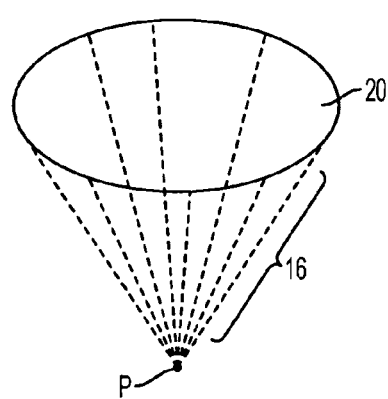
FIG. 3 is a view in the direction of lines 3-3 of FIG. 2.

FIG. 2 shows an aperture 11 like that of FIG. 1, but with a portion removed at 15 to permit lines of sight 16 for point p outside of aperture 11. Because radiation from point p can now escape aperture 11, the Closed Aperture Theorem does not hold. However, because the theorem does hold independent of aperture geometry, any additional aperture that, in conjunction with aperture 11, would close opening 15 would again render detection of radiation from p spatially invariant. This implies that all apertures sized and positioned to receive the identical radiation from point p as would an aperture plugging opening 15 must necessarily be radiatively identical with respect to point p. Thus any aperture sized and shaped to subtend the same solid angle having point p as its vertex, as is subtended by opening 15 (with point p as its vertex) must necessarily be radiatively equivalent to one another as concerns point p. Apertures 20, 22, are examples. Aperture 20 is flat viewed in one direction, and aperture 22 convex viewed in the same direction. FIG. 3 shows lines of sight 16 from point p to the outer circumference of aperture 20, the sum total of these lines of sight defining the surface of the solid angle above described, i.e. that which opening 15 would subtend with respect to point p were opening 15 closed. By way of comment, the outer periphery of aperture 20 is elliptical because, opening 15 being circular, the solid angle delimited by lines of sight 16 is conical, and the periphery of 20 makes a planar cut through the cone.

By way of further comment, to subtend the same solid angle means here more than simply containing the same number of steradians. It means that the aperture be sized and shaped to receive the same illumination from point p. This is seen in FIGS. 2 and 3, where aperture 20 has an elliptical shape to exactly receive all illumination from opening 15, but nothing from outside cone/lines of sight 16. To the extent one deviates from this, one deviates from both the Open and Closed Aperture Theorems, the deviation being, in effect, a source of noise to the process of signal detection. As an aperture moves farther away from a point of interest (such as p) simple geometry dictates that the change in solid angle the aperture subtends changes by increasingly small amounts, and the noise error thereby introduced decreases correspondingly. Thus at distances large compared to the dimensions of the aperture, one would expect solid angle mismatches to be negligible. Quantitatively, if the mismatch is characterized by:

$\Omega$=(area of solid angle overlap)/(area desired to be overlapped)

Then for an aperture having an inherent signal to noise ratio SNR, the signal to noise of the aperture SNR' having such a mismatch is:

SNR'=[$\Omega$*SNR/[(1−$\Omega$)*SNR+1]

As overlap $\Omega$ becomes perfect, $\Omega$=1, SNR' goes to SNR, i.e. the aperture's signal to noise is unchanged, as one would expect. For no overlap at all, $\Omega$=0, SNR' goes to zero, and the aperture will receive no signal at all from point p. Because this mismatch becomes less pronounced at large distances, at such distances the cosine weighting provides the predominant benefit.

Figure 4:
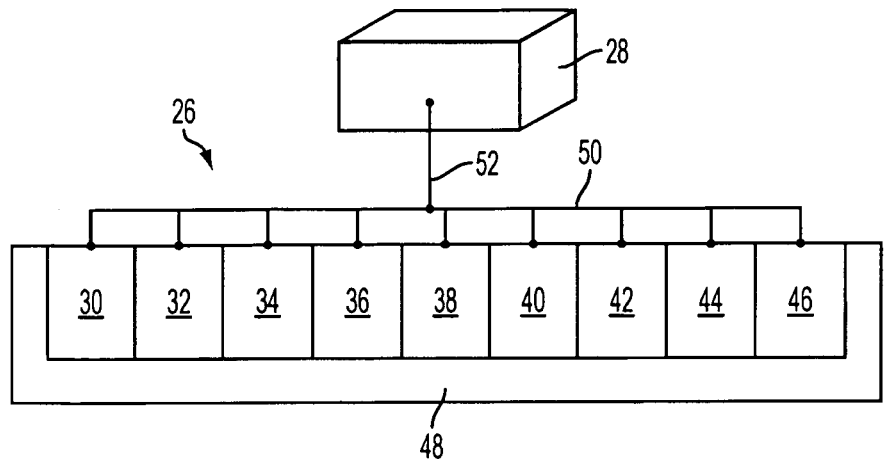
FIG. 4 is a schematic of a radiative aperture and signal processor in accordance with the invention.

FIG. 4 shows schematically a linear sensor array 26, such as one might use, for example, in sonar applications. Array 26 has a structural backing 48 which mounts a linear array of radiation sensors 30, 32, 34, 36, 38, 40, 42, 44, 46, which can be conventional pressure transducers, the outputs of which transmit via communications cables 50, 52 to processor 28, preferably a dedicated programmable digital computer.

Figure 5:
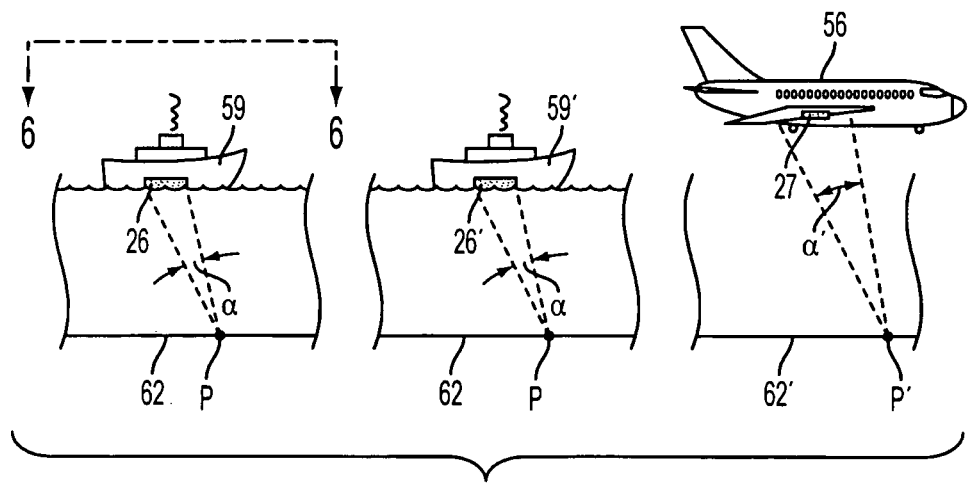
FIG. 5 is a schematic view illustrating operation of the invention.
Figure 6:
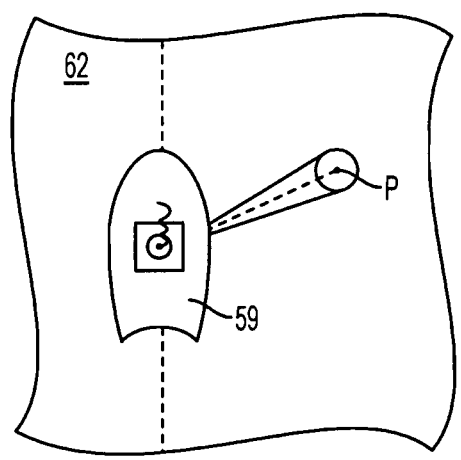
FIG. 6 is a view in the direction 6-6 of FIG. 5.

FIGS. 5 and 6 illustrate an embodiment of the invention in operation for navigation. FIG. 5 shows three platforms, ships 59 and 59', and aircraft 56. (FIG. 6 shows ship 59 from the top, looking downwards towards seabed 62.) Ship 59 has a sonar sensor array 26 which irradiates point p on seabed 62, and receives back the portion of the resultant echo contained within solid angle $\alpha$ subtended by array 26. Ship 59 also has a processor like 28 of FIG. 4 which records the echo and applies cosine weighting to it. This echo information is made available to a similar processor aboard ship 59', which at a later time passes along substantially the same linear path that ship 59 took over point p. As ship 59' does so, its sonar array 26' irradiates seabottom 62, causing array 26' to receive echoes therefrom, to similarly record the echoes, and to apply cosine weighting thereto. Optimally, the size of array 26' would be preselected so that, at the altitude at which ship 59' is disposed above seabed 62, the echo which array 26' receives lies exactly within the same solid angle $\alpha$ subtended by array 26 on ship 59. If this is so, as ship 59' passes near p, array 26' eventually passes over and encloses, i.e. subtends, the same solid angle $\alpha$ as did array 26 on ship 59. At this point, the cosine weighted echo image of point p incident on array 26' is identical to the cosine weighted image of point p incident on array 26 per the Open Aperture Theorem, and thus a comparison of the two echoes (preferably by signal correlation) indicates that ship 59' has located point p. Of course, exact matches are hard to come by, so in practice sensor 26' is preferably sized merely to lie wholly within solid angle $\alpha$. This is illustrated by sensor array 27 on airplane 56. Airplane 56 has a radar sender-receiver 27 disposed to irradiate point p' on ground 62'. Airplane 56 has echo data on board from an earlier flight along substantially the same linear path by an aircraft having a radar sensor that would have subtended angle $\alpha$'. Sensor 27 on airplane 56 is sized and disposed to subtend a solid angle wholly within angle $\alpha$'. If the overlap between the solid angle subtended by array 27 and a' is large, the correlation between the signal from p' will be large, requiring no further processing to identify a match. If the overlap is small, a processor on airplane 56 can null out signal recorded by selected elements of array 26 so as to decrease the effective size of angle $\alpha$' and thus increase relative overlap. In this case the term same solid angle as used above means the portions of the two solid angles that overlap.

Figure 7:
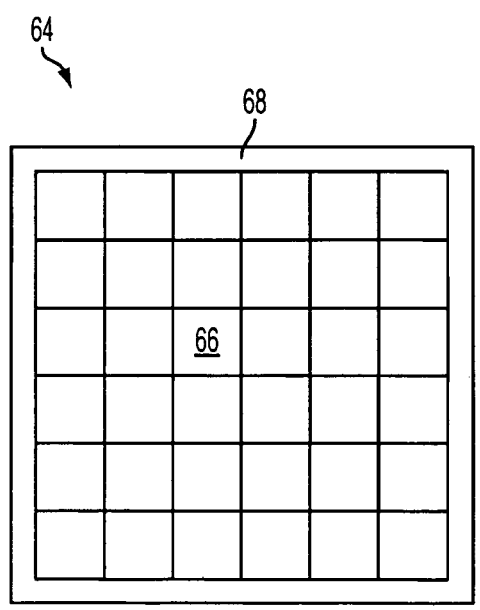
FIG. 7 is a schematic view of an alternative radiative aperture useable in the invention.

The sensor arrays need not be linear. FIG. 7 shows a two dimensional array 64 which has a plurality of sensor cells 66 mounted on structural backing 68. Cells 66 could, again, be acoustic tiles for sonar applications, or electromagnetic sensors (e.g. charged coupled devices). Processor 28 (not shown in FIG. 7) can selectively null out signals from selected elements of 64 to more closely match effective aperture shape and dimensions to subtend the desired solid angle. For example, were apertures 20 and 22 of FIG. 2 tiled arrays as in FIG. 7, processor 28 would leave active only tiles 66 that spatially best match the elliptical shapes projected by opening 15 on apertures 20, 22.

Figure 8A:
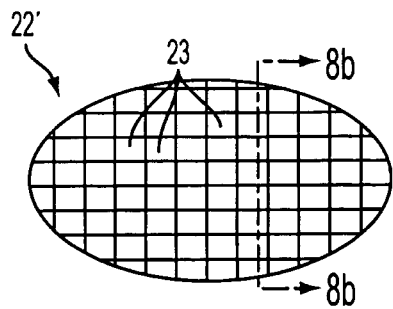
FIG. 8a is a schematic view of a radiative sensor similar to one (element 22) shown FIG. 2, but formed of flat segments, rather than formed in a smooth curve.
Figure 8B:
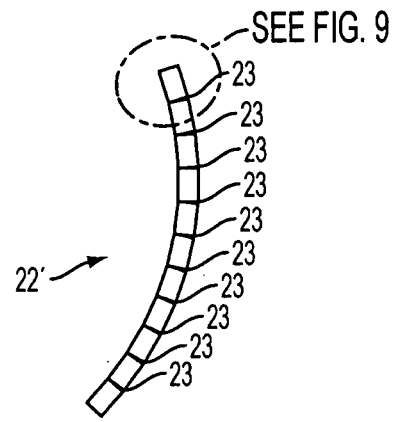
Figure 9:
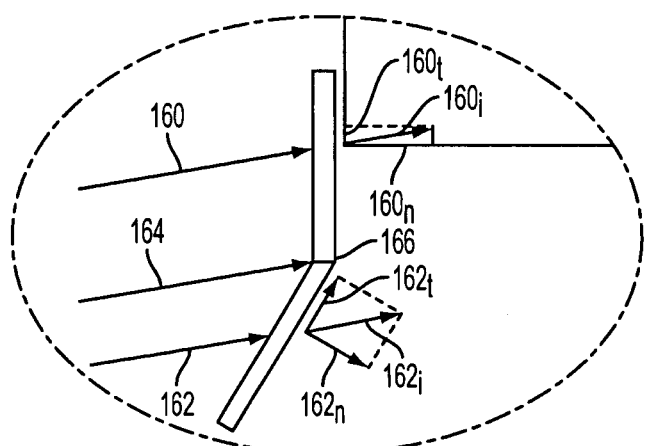
FIG. 9 is an enlarged view of the encircled portion of FIG. 8b labeled 9-9.

Sensors 26, 64 of FIGS. 4 and 7, being composed of discrete sensor elements, will have curvature discontinuities at the junctions between elements unless sensors 26, 64 have perfectly flat curvature. Sensor 22' of FIGS. 8a and 8b has similar discontinuities. Sensor 22' is identical to sensor 22 of FIG. 2, save that sensor 22' is formed of a plurality of flat segments joined to one another end to end. FIG. 9 shows radiation having parallel rays 160, 162, 164 incident respectively upon two adjacent segments of sensor 22', and upon junction 166 between the segments.

On the opposite side of each of segment, FIG. 9 shows the tangential and normal components of rays 160, 162, respectively denominated 160$_t$, 160$_n$ and 162$_t$, 162$_n$, where subscripts t and n indicate respectively tangential and normal. (Vectors 160$_i$, 162$_i$ are collinear with rays 160, 162, with subscript i indicating incident direction.) A comparison of the components indicates, as one would expect, that the tangential and normal components of 160 and 162 are quite different because the orientation of the elements of sensor 22' on which the rays are incident are quite different. The curvature of sensor 22' at junction 166 is discontinuous, meaning that it would yield the same image as a flat or curved array that had a windowing function with discontinuities. By using the cosine weighting discussed above, one filters out all tangential components of radiation incident on sensor 22', thus filtering out tangential component noise produced at junction 164, as well as the junctions between the other segments of sensor 22'. In the same manner, such cosine weighting filters tangential element noise produced at the junction of elements 30 through 46 of sensor 26, and elements 66 of sensor 64. Similarly, if sensor elements have gaps between one another, the gaps produce discontinuities in curvature, which cosine weighting similarly corrects.

If, as in FIG. 5, ship 59 or airplane 56 scans point p at a large distance such that the direction of scan is virtually horizontal, rather than downwards into the sea as illustrated in FIG. 5, then virtually all radiation between sensor 26 or 27 and point p is in the same plane, making the scanning of point p essentially a two dimensional problem. Platform 56 or 59 can then, in effect, form a closed synthetic aperture about point p by tracing out a closed path about p while scanning. An advantage of so doing is that the synthetic aperture thus formed closely obeys the Closed Aperture Theorem, and one need not be concerned whether the aperture subtends a given solid angle. Another advantage is that under the Closed Aperture Theorem, the shape of the path traced about point p is irrelevant so long as it is closed, and experience teaches that rectangular paths are easier to trace reliably in the field than circular ones. Similar to this are medical radiation devices, such as MRIs, in which a patient is disposed within a closed ring or tube of sufficient length that radiation leakage out of the ring/tube is negligible, which, again, closely approximates the conditions of the Closed Aperture Theorem with its attendant advantages.

Sensor arrays 26, 64, are illustrated as flat, but they of course need not be so as long as one knows array shape sufficient to permit processor 28 to determine a normal to each point on it, and calculate $\cos(\alpha)$ at each array point, as above described. This is of particular note for medical applications, in which the aperture will often have curvature dictated by the shape of a human body.

The invention has been described in what is considered to be the most practical and preferred embodiments. It is recognized, however, that obvious modifications to these embodiments may occur to those with skill in this art. Accordingly, the scope of the invention is to be discerned by reference to the appended claims, wherein:

The invention claimed is:

1. A system, said system comprising:
   a first radiation sensor having a first radiative aperture, said first aperture subtending a first solid angle with a point located at a distance from said first aperture; and
   a processor having an operative connection to said first sensor, said operative connection effective to weight an amount of radiation from said point incident on substantially each position on said first aperture by a cosine of an angle formed between a position vector from said each position to said point and a vector normal to said first aperture at said each position, said operative connection effective to correlate said weighted amounts from said first aperture with previously obtained weighted amounts to identify said point.

2. The system of claim 1, wherein said previously obtained weighted amounts are based on said first aperture having been disposed at a second distance to subtend a second solid angle with said point, said second solid angle being no greater than said first solid angle and lying within said first solid angle.

3. The system of claim 2, wherein said first aperture comprises an array of sensor elements and said first solid angle is larger than said second solid angle, said operative connection to said first sensor effective to null at least one of said sensor elements to decrease a size of said first solid angle.

4. The system of claim 3, wherein said first aperture comprises an array of sensor elements and said first solid angle is larger than said second solid angle, said operative connection to said first sensor effective to null at least one of said sensor elements to decrease a size of said first solid angle.

5. The system of claim 1, and said system further comprises:
   a second radiation sensor having a second radiative aperture, said second aperture subtending a second solid angle with said point, said second solid angle being no greater than said first solid angle and lying within said first solid angle; and
   a second processor having a second operative connection to said second radiation sensor, said second operative connection effective to obtain said previously weighted amounts for radiation from said point incident on substantially each position on said second aperture based on the cosine of the angle formed between a position vector from said each position on said second aperture to said point and a vector normal to said second aperture at said each position on said second aperture.

6. The system of claim 5, wherein said first aperture comprises an array of sensor elements and said first solid angle is larger than said second solid angle, said operative connection to said first sensor effective to null at least one of said sensor elements to decrease a size of said first solid angle.

7. A method for identifying a point, said method comprising:
   deploying a first radiation sensor having a first radiative aperture located at a distance from said point to subtend a first solid angle with said point, using a processor to weight an amount of radiation incident on substantially each position on said first aperture by a cosine of an angle between a position vector from said each position to said point and a vector normal to said first aperture at said each position; and
   correlating said weighted amounts from said first aperture with previously obtained weighted amounts to identify said point.

8. The method of claim 7, further comprising:
   disposing said first aperture at a second distance to subtend a second solid angle with said point, said second solid angle being no greater than said first solid angle and lying within said first solid angle; and
   weighting an amount of radiation from said point at said second distance incident on substantially each position on said first aperture by a cosine of an angle between a position vector from said each position to said point and a vector normal to said first aperture at said each position to obtain said previously obtained weighted amounts.

9. The method of claim 7, further comprising:

deploying a second radiation sensor having a second radiative aperture to subtend a second solid angle with said point, said second solid angle being no greater than said first solid angle and lying within said first solid angle; and weighting an amount of radiation received from said point incident on substantially each position on said second aperture by a cosine of an angle between a position vector from said each position to said point and a vector normal to said second aperture at said each position to obtain said previously weighted amounts.

10. A system, said system comprising:

a first radiation sensor having a first radiative aperture, said first aperture subtending a first solid angle with a point located at a distance from said first aperture;

a second radiation sensor having a second radiative aperture, said second aperture subtending a second solid angle with said point, said second solid angle being no greater than said first solid angle and lying within said first solid angle; and at least one processor having an operative connection to said first and second radiation sensors, said operative connection effective to weight an amount of radiation from said point incident on substantially each position on said first and second apertures by a cosine of an angle formed between a position vector from said each position to said point and a vector normal to said respective first and second apertures at said each position, said operative connection effective to correlate said weighted amounts from said first and second apertures to identify said point.

* * * * *